United States Patent

Helmer

[11] 3,726,153
[45] Apr. 10, 1973

[54] MOUNTING SUPPORTS FOR THE ENDS OF BRAKE BANDS OF AUTOMATIC TRANSMISSIONS

[75] Inventor: Josef Helmer, Aich, Germany
[73] Assignee: Daimler-Benz AG, Stuttgart, Unterturkheim, Germany
[22] Filed: Dec. 15, 1970
[21] Appl. No.: 98,239

[30] Foreign Application Priority Data

Jan. 14, 1970  Germany.....................P 20 01 440.8

[52] U.S. Cl..................................74/606, 188/77 R
[51] Int. Cl...............................................F16h 57/02
[58] Field of Search.............................74/606, 753; 188/77 R, 79, 234

[56]  References Cited

UNITED STATES PATENTS 3,403,757  10/1968  Erickson ..................................188/77
3,125,901  3/1964  Norton ...................................74/606 X Primary Examiner—Charles J. Myhre
Assistant Examiner—F. D. Shoemaker
Attorney—Craig, Antonelli, Stewart & Hill

[57] ABSTRACT

A mounting support for the ends of brake bands of automatic transmissions, especially for motor vehicles, which is made from synthetic resinous material and is interchangeably secured in the transmission housing by a dovetail guidance; the mounting support is secured against sliding out of the dovetail guidance by means of a housing part adjoining the same and provided with a projection.

21 Claims, 3 Drawing Figures

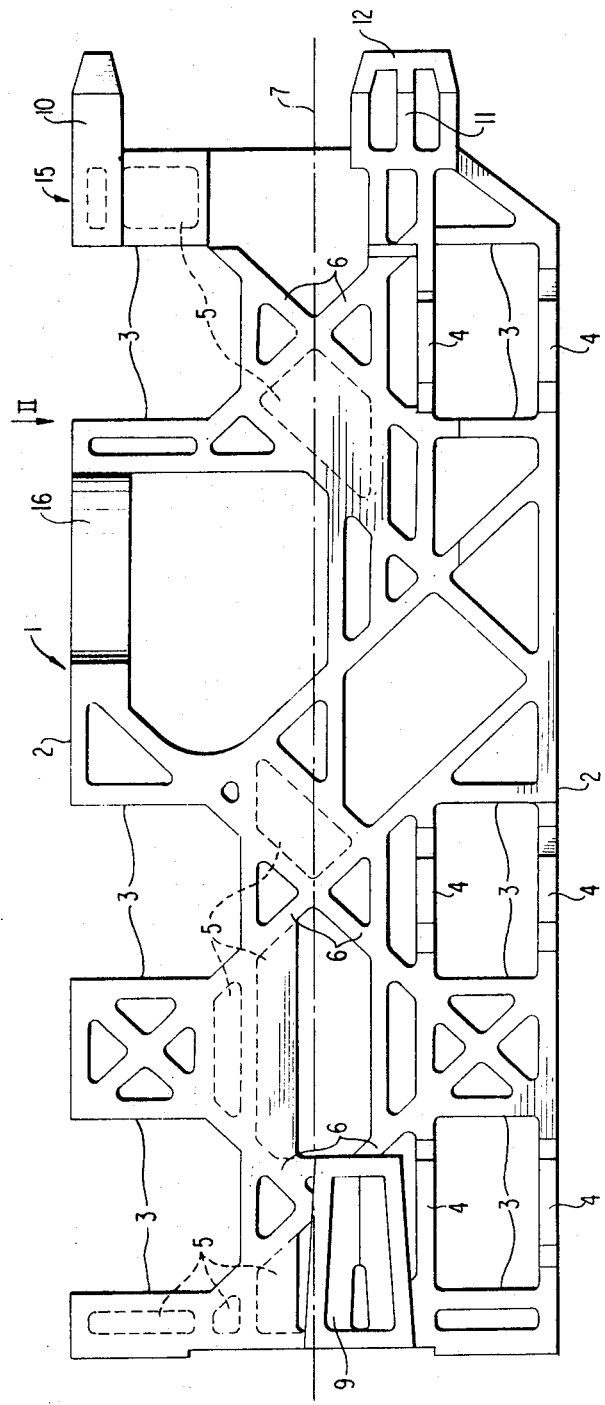
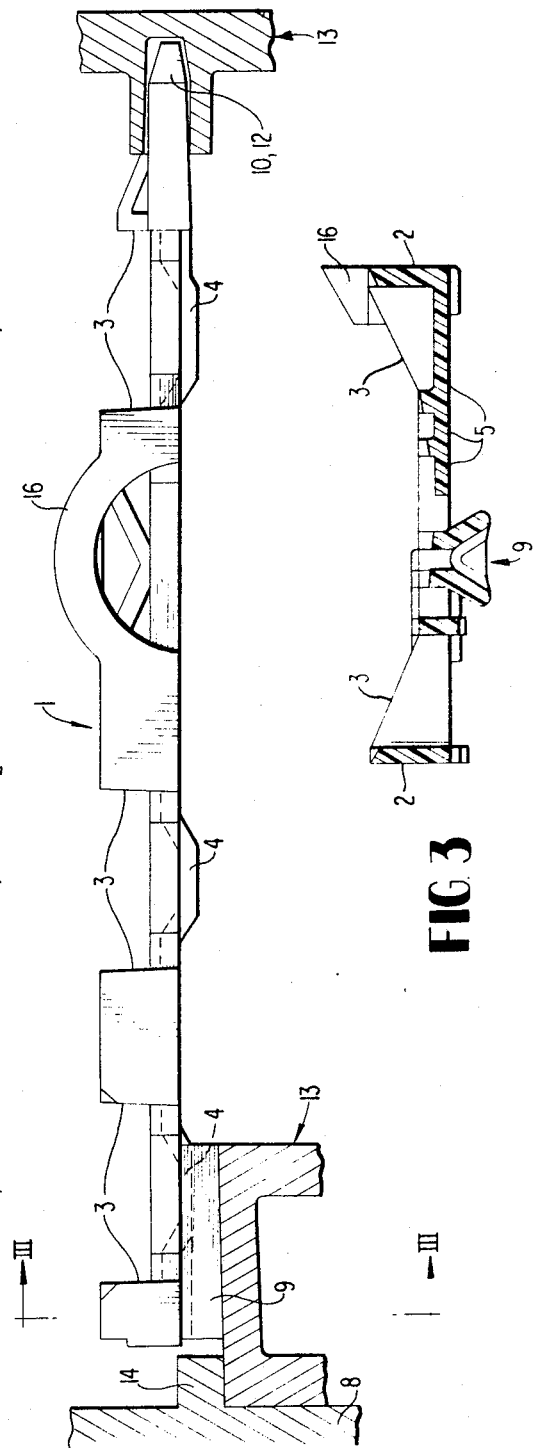

MOUNTING SUPPORTS FOR THE ENDS OF BRAKE BANDS OF AUTOMATIC TRANSMISSIONS

The present invention relates to a mounting support for the ends of brake bands of automatic transmissions, especially for motor vehicles.

The mounting supports presently known consist of metal. This entails the disadvantage that the wear is relatively high at the abutment surfaces for the ends of the brake bands and that the transmissions are damaged at these places as a result of the wear and abrasion. Furthermore, in the prior art devices the mounting supports are secured in the transmission housing by means of screws or bolts. With this type of assembly an unnecessarily large amount of time is required.

The present invention aims at providing a wear-resistant mounting support that can be easily mounted and assembled. The underlying problems are solved according to the present invention in that the mounting support is made from any conventional suitable synthetic resinous material and is secured interchangeably in the transmission housing by the arrangement of a dove-tail guidance, whereby the mounting support is secured against slipping out of the dove-tail guidance on the driving side of the transmission housing by an adjoining housing part provided with a projection.

According to a preferred embodiment of the present invention, the mounting supports may consist essentially of a lattice framework with some bottom elements inserted for the purposes of reinforcement; the abutment surfaces for the ends of the brake bands are provided laterally at the lattice-type framework. As a result of the apertures of the lattice framework, the transmission oil can flow through without impairment which was not possible with the heretofore customary mounting supports by reason of the continuous, uninterrupted bottom.

A further feature of the present invention essentially resides in that the dove-tail guidance is constructed essentially wedge-shaped in its longitudinal direction. The assembly is additionally simplified and a secure seating of the mounting support is attained thereby.

Accordingly, it is an object of the present invention to provide a mounting support for the ends of brake bands of automatic transmissions which avoids by simple means the aforementioned shortcomings and drawbacks encountered in the prior art.

Another object of the present invention resides in a mounting support for the ends of brake bands which minimizes the wear and prevents damage to the transmission at the abutment surfaces for the ends of the brake bands.

A further object of the present invention resides in a mounting support of the type described above which can be easily assembled and installed without requiring an unnecessarily large amount of time.

A still further object of the present invention resides in a mounting support for the ends of brake bands which can be manufactured in a simple and relatively inexpensive manner by utilizing conventional injection or pressure molding techniques, yet assures a long life of the transmission.

These and further objects, features and advantages of the present invention will become more obvious from the following description when taken in connection with the accompanying drawing which shows, for purposes of illustration only, one embodiment in accordance with the present invention, and wherein:

FIG. 1 is a bottom plan view of a mounting support in accordance with the present invention;

FIG. 2 is an elevational view of the mounting support according to FIG. 1, taken in the direction of the arrow II; and FIG. 3 is a cross-sectional view through the mounting support of FIG. 1 taken along line III—III of FIG. 2.

Referring now to the drawing, wherein like reference numerals are used throughout the various views to designate like parts, and more particularly to FIG. 1, the mounting support essentially consists of a lattice framework generally designated by reference numeral 1 made from synthetic resinous material of any conventional type, whose over-all shape is far-reachingly matched to the minimal space conditions available on the inside of a transmission. Three pairs of abutment surfaces 3 each are arranged at the two longitudinal sides 2 of the mounting support 1 for the ends of three brake bands (not shown) of a transmission; for reasons of lack of space, the abutment surfaces 3 are connected with each other pairwise only on one side of the lattice framework 1 by two webs 4 each, which, as can be seen from FIG. 2, are bent through in the downward direction. Bottom elements 5 inserted into the apertures of the lattice framework 1 serve on the other side thereof, i.e., opposite to the side where the webs 4 are provided, for the purpose of reinforcement, as can be seen from FIG. 3. Also, for the reinforcement and for the distribution of the forces occurring at the abutment surfaces 3, two reinforcing ribs 6 each cross one another on a longitudinal axis 7 of the lattice framework 1 at an angle of about 85° to 95°, which reinforcing ribs 6 connect with each other respective diagonally mutually oppositely disposed abutment surfaces 3. A hollow dovetail guidance 9 is provided at the end of the lattice framework 1 facing a housing part 8, schematically indicated in FIG. 2 and belonging to a clutch; the hollow dovetail guidance 9 is provided at the bottom side of the lattice frame 1 approximately adjacent the longitudinal axis 7 and tapers in a wedge-shaped manner in the direction toward the output of the transmission. At the opposite end of the frame 1 is provided—directly in line and terminating along a longitudinal side 2—a pin 10 while a pin-like projection 12 terminates along the other side 2. The pin-like projection 12 is provided with parallel ribs 11 parallel to the longitudinal axis 7 and is disposed to the rear of the longitudinal axis 7 as viewed from the pin 10. The pin 10 and the projection 12 serve together with the dove-tail guidance 9 for fixing the lattice frame 1 in a transmission housing generally designated by reference numeral 13 and only schematically indicated in FIG. 2. A projection 14 is provided at the housing part 8 which secures the lattice frame 1 against slipping out of the dove-tail guidance 9. As can be seen also from FIGS. 2 and 3, the upper sides of the abutment surfaces 3 and of the parts carrying the same rise in a direction toward the longitudinal sides 2 under an angle of about 25° whereas the central area of the lattice frame 1 and the entire bottom side thereof as well as the upper side of a frame part 15 carrying the pin 10 are constructed essentially flat. A semi-circularly shaped, bridge-like arc 16 for the accommodation of another transmission part, for example, of a hydraulic cylinder is provided according to FIG. 2 along one longitudinal side 2 of the frame 1.

While I have shown and described only one embodiment in accordance with the present invention, it is understood that the same is not limited thereto, but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A mounting support for guiding the movement of the free ends of brake bands in brake band arrangements of the type wherein the free ends of respective brake bands are selectively movable with respect to one another during braking and brake disengaging operations, especially for brake band arrangements in transmissions having transmission housing means; said mounting support comprising: at least one pair of abutment surface portions exhibiting abutment surfaces for guiding the ends of a brake band, dovetail guide means for interchangeably securing said mounting support in a corresponding dovetail guide means of a transmission housing means, and a securing surface portion adjacent said dovetail guide means for engaging with a projection means of said transmission means to secure said mounting support from slipping out of said transmission housing means.

2. A mounting support according to claim 1, wherein said mounting support is formed of synthetic resinous material and includes a lattice-like frame means interconnecting said at least one pair of abutment surface portions, said lattice-like frame means including apertures for permitting free passage of transmission oil.

3. A mounting support according to claim 2, wherein said lattice-like frame means, said abutment surface portions, and said dovetail guide means are formed in one-piece of said synthetic resinous material.

4. A mounting support according to claim 2, wherein said lattice-like frame means extends longitudinally from a first end having the dovetail guide means to a second end, and wherein further securing means are provided at said second end for securing said mounting support in position in said transmission housing means.

5. A mounting support according to claim 4, wherein said lattice-like frame means is constructed substantially flat between said first and second ends and exhibits first and second oppositely disposed lateral edge portions extending in the longitudinal direction of the frame means, and wherein the two abutment surface portions of said pair are arranged respectively adjacent said first and second lateral edge portions.

6. A mounting support according to claim 5, wherein a plurality of pairs of abutment surface portions are spaced from one another in the longitudinal direction of the frame means for guiding the ends of a corresponding plurality of brake bands.

7. A mounting support according to claim 4, wherein said further securing means includes a longitudinally extending pin means for engaging in a corresponding aperture of said transmission housing.

8. A mounting support according to claim 7, wherein said further securing means further includes a longitudinally extending projection means spaced laterally from said pin means for engaging in a corresponding further aperture of said transmission housing.

9. A mounting support according to claim 6, wherein said further securing means includes a longitudinally extending pin means adjacent the first edge portion and a longitudinally extending projection means adjacent the second edge portion, said pin means and projection means being engageable with corresponding apertures of said transmission housing to secure along with said dovetail guide means, the mounting support means in position in the transmission housing.

10. A mounting support according to claim 9, wherein said pin means and projection means are formed one-piece with said lattice-like frame means.

11. A mounting support according to claim 1, wherein said dovetail guide means is wedge-shaped in the longitudinal direction.

12. A mounting support according to claim 4, wherein said dovetail guide means taper wedge-shaped in the longitudinal direction of the frame means.

13. A mounting support according to claim 2, wherein said lattice-like frame means includes mutually crossing reinforcing rib means extending diagonally between the respective abutment surface portions of said at least one pair.

14. A mounting support according to claim 13, wherein the rib means intersect one another at an angle of approximately 85° to 95° within the area of a longitudinal axis of the frame means.

15. A mounting support according to claim 6, wherein said lattice-like frame means includes mutually crossing reinforcing rib means extending diagonally between the respective abutment surface portions of each pair of abutment surface portions.

16. A mounting support according to claim 15, wherein the rib means intersect one another at an angle of approximately 85° to 95° within the area of the longitudinal axis of the frame means.

17. A mounting support according to claim 5, wherein the abutment surfaces of said abutment surface portions are inclined approximately 25° with respect to the flat portion of said frame means.

18. A mounting support according to claim 5, wherein semicircularly shaped, bridge-like arc is formed on said frame means intermediate said first and second ends for accommodating another transmission part such as a hydraulic cylinder.

19. A mounting support according to claim 3, further comprising reinforcing elements inserted into said lattice-like frame means for reinforcing same.

20. A mounting support according to claim 10, further comprising a plurality of reinforcing elements inserted into said lattice-like frame means for reinforcing said frame means.

21. A mounting support according to claim 5, wherein said abutment surface portions include means for preventing movement of the ends of the brake band in the longitudinal direction of the frame means.

* * * * *